(12) United States Patent
Taguchi et al.

(10) Patent No.: US 10,250,331 B2
(45) Date of Patent: Apr. 2, 2019

(54) SUBSCRIBER DEVICE AND LIGHT RECEIVING METHOD

(71) Applicant: NIPPON TELEGRAPH AND TELEPHONE CORPORATION, Tokyo (JP)

(72) Inventors: Katsuhisa Taguchi, Yokosuka (JP); Kota Asaka, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 15/573,706

(22) PCT Filed: May 19, 2016

(86) PCT No.: PCT/JP2016/064919
§ 371 (c)(1),
(2) Date: Nov. 13, 2017

(87) PCT Pub. No.: WO2016/186176
PCT Pub. Date: Nov. 24, 2016

(65) Prior Publication Data
US 2018/0145758 A1    May 24, 2018

(30) Foreign Application Priority Data

May 21, 2015  (JP) ................. 2015-103713

(51) Int. Cl.
*H04B 1/16*    (2006.01)
*H04B 10/69*   (2013.01)
(Continued)

(52) U.S. Cl.
CPC ............. *H04B 10/272* (2013.01); *H04B 1/16* (2013.01); *H04B 10/69* (2013.01); *H04J 14/02* (2013.01); *H04J 14/0282* (2013.01)

(58) Field of Classification Search
CPC ........ H04B 10/272; H04B 10/69; H04B 1/16; H04J 14/02; H04J 14/0282
(Continued)

(56) References Cited

U.S. PATENT DOCUMENTS 6,941,079 B1 * 9/2005 Barozzi ................ H04B 10/077
359/337
2006/0120724 A1   6/2006 Ishimura
(Continued)

FOREIGN PATENT DOCUMENTS

JP    2006-165953 A    6/2006
JP    2008-147913 A    6/2008
(Continued)

OTHER PUBLICATIONS

K. Taguchi, H. Nakamura, K. Asaka, S. Nakano, S. Kimura, and N. Yoshimoto,"100-ns λ-selective burst-mode transceiver for 40-km reach symmetric 40-Gbit/sWDM/TDM-PON", ECOC '2013, Mo.4. F.5.
(Continued)

*Primary Examiner* — Dalzid E Singh
(74) *Attorney, Agent, or Firm* — Harness, Dickey & Pierce, P.L.C.

(57) ABSTRACT

A subscriber device includes a demultiplexer configured to demultiplex input wavelength-multiplexed light into a plurality of light signals for each wavelength, a plurality of light receivers configured to receive each of the plurality of light signals obtained through demultiplexing by the demultiplexer and to convert the light signals into electrical signals, a plurality of limiting amplifiers configured to amplify each of the plurality of electrical signals output from the plurality of light receivers, and a plurality of signal selection units configured to select a plurality of signals to be received from among a plurality of amplified signals output from the plurality of limiting amplifiers.

4 Claims, 5 Drawing Sheets

(51) Int. Cl.
*H04B 10/272* (2013.01)
*H04J 14/02* (2006.01)

(58) Field of Classification Search
USPC .......................................................... 398/79
See application file for complete search history.

(56) References Cited

U.S. PATENT DOCUMENTS

| | | | |
|---|---|---|---|
| 2008/0138072 A1 | 6/2008 | Sakamoto et al. | |
| 2011/0182591 A1* | 7/2011 | Ikeuchi | H04B 10/673 |
| | | | 398/208 |
| 2012/0294623 A1* | 11/2012 | Lee | H04J 14/0221 |
| | | | 398/135 |

FOREIGN PATENT DOCUMENTS

| | | | | |
|---|---|---|---|---|
| JP | 2008-277962 A | 11/2008 | | |
| JP | 2014-138291 A | 7/2014 | | |
| WO | WO 2006058459 A1 * | 6/2006 | ............. | H04B 10/66 |

OTHER PUBLICATIONS

S. Kimura, "WDM/TDM-PON Technologies for Future Flexible Optical Access Networks", 15th OECC 2010, 6A1-1.
International Search Report for PCT/JP2016/064919, ISA/JP, Tokyo, dated Jul. 19, 2016, with English translation thereof.

* cited by examiner

SUBSCRIBER DEVICE AND LIGHT RECEIVING METHOD

CROSS-REFERENCE TO RELATED APPLICATIONS

This application is a 371 U.S. National Stage of International Application No. PCT/JP2016/064919, filed May 19, 2016, which claims the benefit of and priority to Japanese Patent Application No. 2015-103713, filed May 21, 2015. The disclosures of the above applications are incorporated herein by reference.

TECHNICAL FIELD

The present invention is technology related to a subscriber device and a light receiving method thereof in passive optical networks (PONs) in which wavelength multiplexing and time division multiplexing are combined.

BACKGROUND ART

In recent years, with the rapid spread of the Internet, there has been demand for a larger capacity, upgrading, and cost-effectiveness of an optical access system. Research on PON has proceeded as a technique for implementing such a system. PON is a cost-effective optical access communication system in which a plurality of users can share a transmission path between a center device and an optical passive element by an optical passive element such as an optical power splitter accommodating a plurality of transmission paths from the plurality of users in a single transmission path.

At present, in Japan, there is introducing a cost-effective optical access communication system GE-PON (Gigabit Ethernet (registered trademark)-PON) in which up to 32 users share 1 Gbps class line capacity according to time division multiplexing (TDM). Thereby, a fiber-to-the-home (FTTH) service has been provided to the users at a practical fee and spread rapidly.

Meanwhile, research on a 10 G-Ethernet passive optical network (EPON) of 10 Gbps class has proceeded as a next generation optical access system capable of coping with the needs for larger capacity and IEEE standardization thereof was completed in 2009. This scheme provides a system capable of increasing the capacity while using the same GE-PON as the existing one for a transmission path portion due to an increase in a bit rate of a light transceiver. Also, a larger capacity beyond 10 Gbps class may be required according to a service such as a high-definition video service. However, further speeding up of the bit rate of the transceiver (40 or 100 Gbps class) leads to a significant increase in cost of the transceiver and there is a problem in that a system is not practical.

Figure 1:
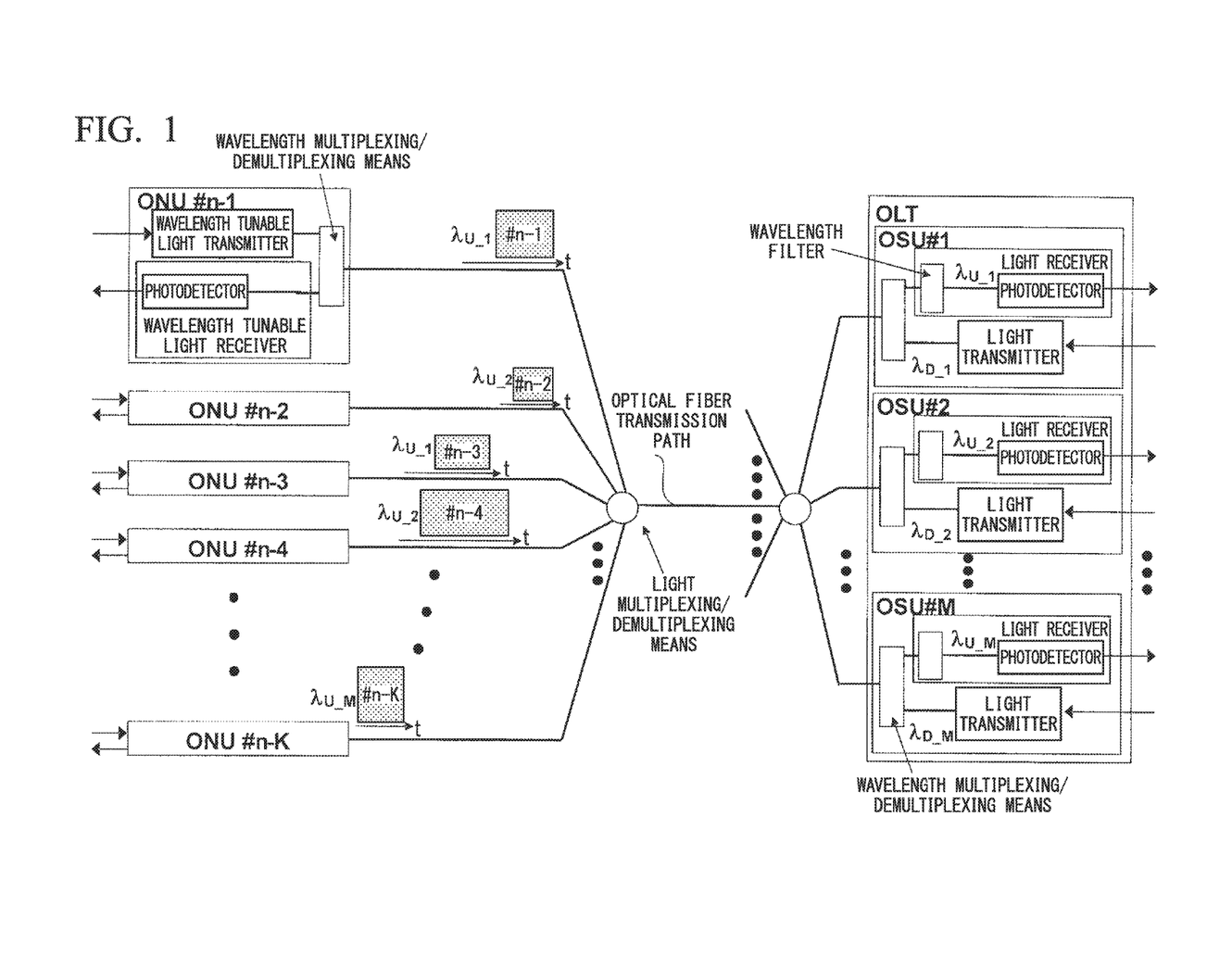
FIG. 1 is a configuration diagram showing a conventional wavelength tunable WDM/TDM-PON.

As means for cost-effectively implementing large capacity, a wavelength tunable wavelength division multiplexing (WDM)/TDM-PON in which wavelength tunability is given to a light transceiver so that the number of light transceivers within a station-side device can be gradually increased in accordance with a bandwidth requirement and in which TDM and WDM are combined has been reported (for example, see Non-Patent Document 1). FIG. 1 is a configuration diagram showing the wavelength tunable WDM/TDM-PON.

The WDM/TDM-PON system requires a light transceiver having wavelength tunability for a subscriber device or a station-side device. As is known, a light receiver for the wavelength tunable WDM/TDM-PON can configure a wavelength tunable receiver by demultiplexing wavelength-multiplexed N-wave signal light for each wave with a wavelength filter and then selecting and receiving an electrical signal corresponding to signal light having a desired wavelength in an electric switch after a photodiode (PD) corresponding to each wavelength photoelectrically converts signal light into an electrical signal (for example, Patent Document 1).

DOCUMENT OF PRIOR ART

Patent Document

[Patent Document 1]
Japanese Unexamined Patent Application, First Publication No. 2014-138291

Non Patent Document

[Non Patent Document 1]
K. Taguchi, H. Nakamura, K. Asaka, S. Nakano, S. Kimura, and N. Yoshimoto, "100-ns λ-selective burst-mode transceiver for 40-km reach symmetric WDM/TDM-PON," ECOC '2013, Mo. 4. F. 5.

SUMMARY OF INVENTION

Technical Problem

Figure 2:
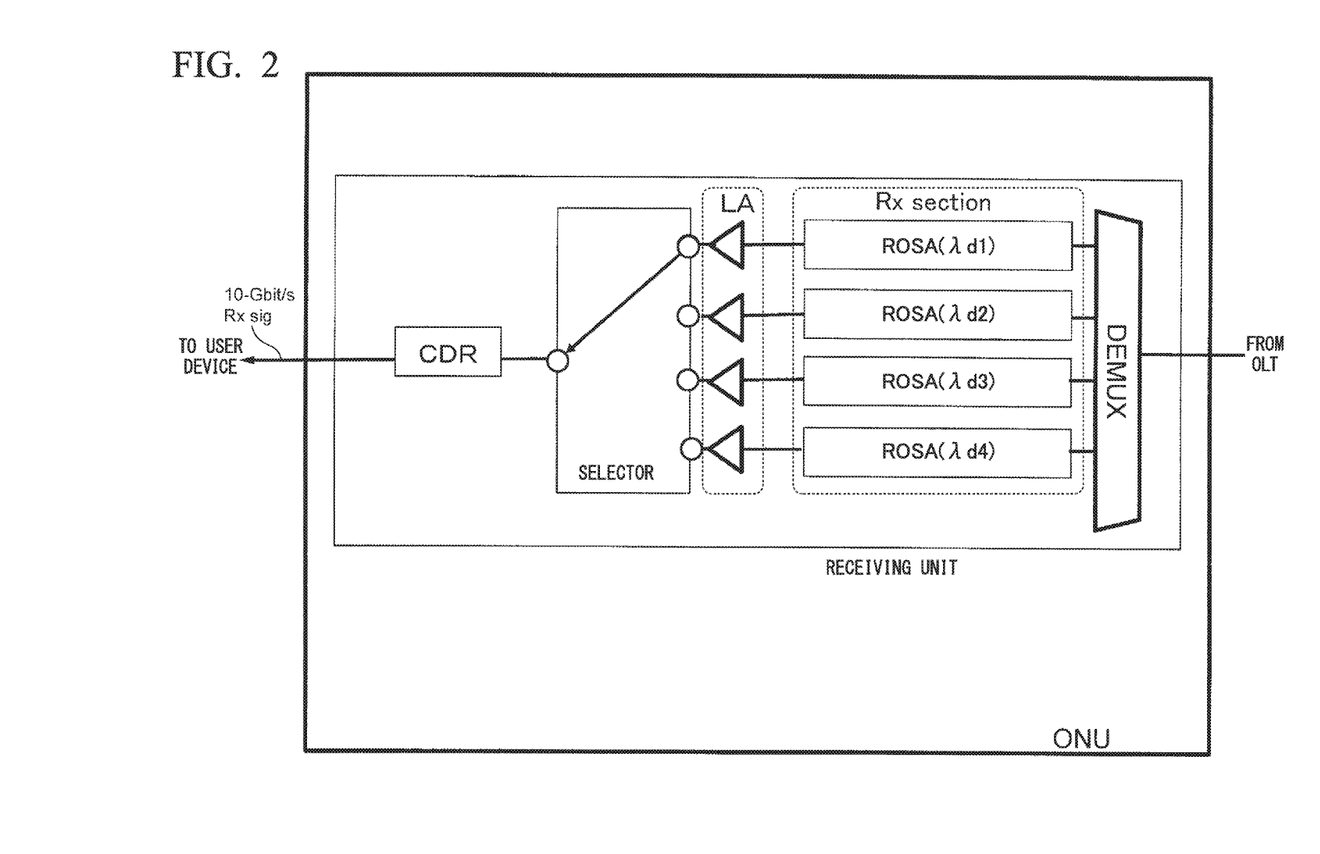
FIG. 2 is a diagram showing a configuration of a conventional ONU.

However, even when a scheme in which a plurality of wavelengths are assigned to an optical network unit (ONU) as a subscriber device to provide a plurality of services is desired to be adopted in the conventional WDM/TDM-PON system, the ONU cannot select a plurality of wavelengths at the same time because the ONU is configured to select a single wavelength with a selector as shown in FIG. 2. Thus, for structural reasons, only a single wavelength can be assigned to the ONU, and a plurality of wavelengths cannot be assigned at the same time. Thus, the conventional WDM/TDM-PON system has a problem in that it is not possible to cope with a scheme in which a different wavelength is assigned for each service and the same user receives a plurality of services with the same ONU in the future.

An objective of the present invention is to provide a subscriber device and a light receiving method thereof capable of receiving a signal of a plurality of wavelengths at the same time.

Solution to Problem

In order to achieve the aforementioned objective, the present invention includes two or more signal selection units for one ONU which receives light signals of a plurality of wavelengths to which a plurality of services are assigned in downlink signal reception.

Specifically, a first aspect of the present invention is a subscriber device including: a demultiplexer configured to demultiplex input wavelength-multiplexed light into a plurality of light signals for each wavelength; a plurality of light receivers configured to receive each of the plurality of light signals obtained through demultiplexing by the demultiplexer and to convert the light signals into electrical signals; a plurality of limiting amplifiers configured to amplify each of the plurality of electrical signals output from the plurality of light receivers; and a plurality of signal selection units configured to select a plurality of signals to be received from among a plurality of amplified signals output from the plurality of limiting amplifiers.

Also, a second aspect of the present invention is a light receiving method including: a demultiplexing procedure of demultiplexing input wavelength-multiplexed light into a plurality of light signals for each wavelength; a light receiving procedure in which a plurality of light receivers receive each of the plurality of light signals obtained through demultiplexing in the demultiplexing procedure and convert the plurality of light signals into a plurality of electrical signals; an amplifying procedure in which a plurality of limiting amplifiers amplify each of the plurality of electrical signals output from the plurality of light receivers; and a selecting procedure in which a plurality of signal selection units select a plurality of signals to be received from among a plurality of amplified signals output from the plurality of limiting amplifiers.

Because the signal selection units can select a plurality of signals of wavelengths corresponding to services to be used in the subscriber device and the light receiving method, it is possible to cope with a service with a scheme in which separate services are assigned to different wavelengths. Accordingly, the present invention can provide a subscriber device and a light receiving method thereof capable of receiving a signal of a plurality of wavelengths at the same time.

According to a third aspect of the present invention, in the subscriber device of the first aspect, each of the signal selection units is configured to exclusively select an amplified signal from among the plurality of amplified signals output from the plurality of limiting amplifiers as the signal to be received.

According to a fourth aspect of the present invention, in the subscriber device of the first aspect, at least one signal selection unit of the plurality of signal selection units is configured to select an amplified signal including a desired service as the signal to be received from among the plurality of amplified signals output from the plurality of limiting amplifiers.

According to a fifth aspect of the present invention, the subscriber device of the first, third, or fourth aspect further includes a power-supply management unit configured to stop a power supply of a light receiver that outputs the electrical signal which is not selected by any one of the plurality of signal selection units and a power supply of a limiting amplifier that outputs the amplified signal which is not selected by any one of the plurality of signal selection units. Because the subscriber device can turn off a power supply of a circuit through which a signal other than the desired service passes, it is possible to reduce power consumption.

Advantageous Effects of Invention

The present invention can provide a subscriber device and a light receiving method thereof capable of receiving a signal of a plurality of wavelengths at the same time.

DESCRIPTION OF EMBODIMENTS

First Embodiment

Figure 3:
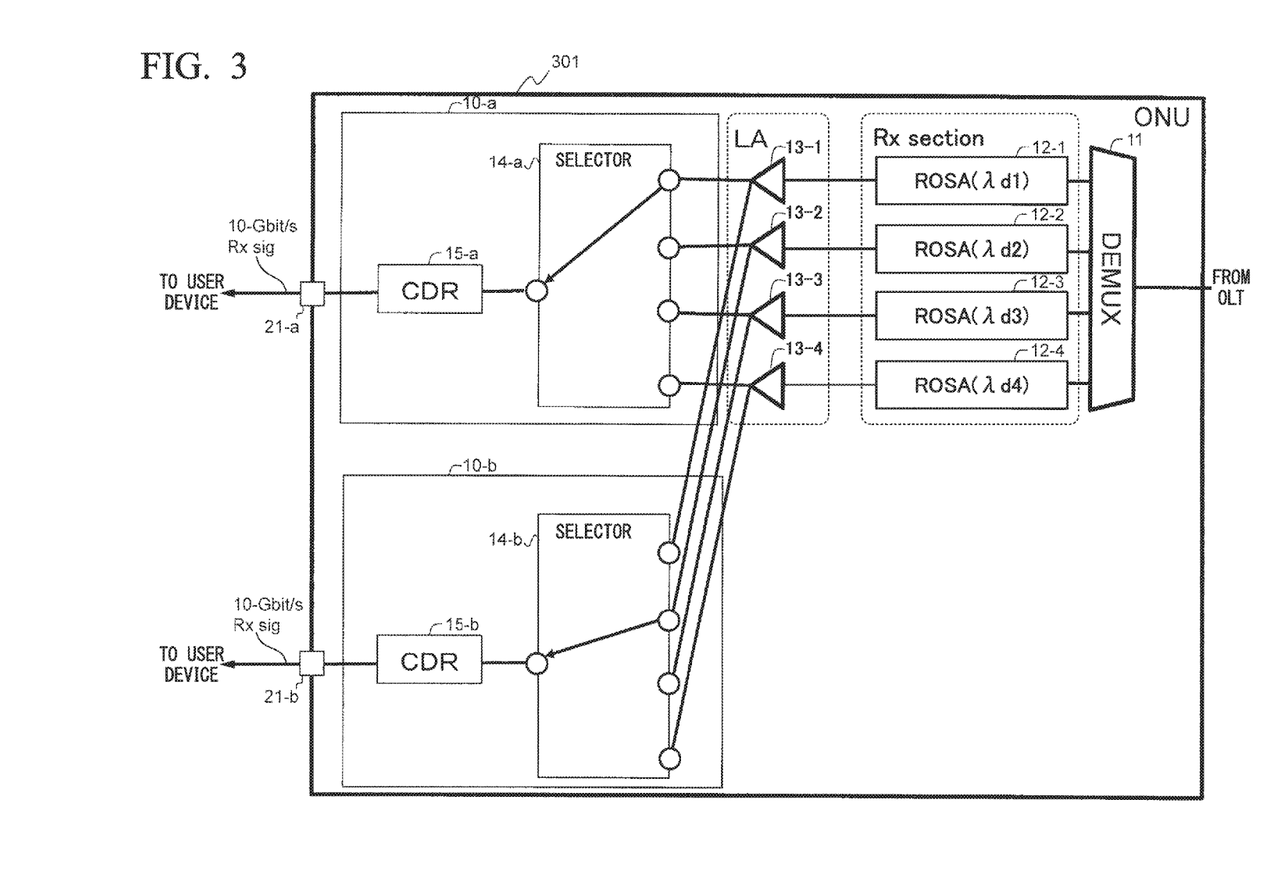
FIG. 3 is a block diagram showing a configuration of an ONU according to a first embodiment of the present invention.

FIG. 3 is a configuration diagram showing an ONU 301 of the present embodiment.

The ONU 301 includes
a demultiplexer 11 configured to demultiplex input wavelength-multiplexed light for each wavelength,
n (n is a natural number greater than or equal to 2) light receivers 12 configured to receive light signals obtained through demultiplexing by the demultiplexer 11 for each wavelength,
n limiting amplifiers (LAs) 13 configured to amplify the signals received by the light receivers 12, and
m selectors 14 configured to exclusively select one of the signals amplified by the LAs 13.

In the present embodiment, n=4 and m=2.

The demultiplexer 11 demultiplexes a wavelength-multiplexed signal from an optical line terminal (OLT) for each wavelength. In the present embodiment, the wavelength-multiplexed light includes light signals of four wavelengths $\lambda d1$, $\lambda d2$, $\lambda d3$, and $\lambda d4$ and the demultiplexer 11 demultiplexes the wavelength-multiplexed light into the four wavelengths. The light receiver 12 converts the light signal obtained through demultiplexing by the demultiplexer 11 into an electrical signal. In the present embodiment, because the number of light signals obtained through demultiplexing is four, four light receivers 12-1 to 12-4 are arranged. For example, the light receiver 12 may be a receiver optical sub assembly (ROSA). An electrical signal output from the light receiver 12 is amplified by an LA 13. In the present embodiment, the LAs 13 are arranged at the rear stage of each light receiver 12.

Each of the four electrical signals amplified by the LAs 13 is branched into two and input to input ports of selectors 14-a and 14-b. The selectors 14 exclusively select an electrical signal. For example, if the selector 14-a selects the electrical signal from an LA 13-1, the selector 14-b selects an electrical signal from an LA other than the LA 13-1 (the electrical signal from the LA 13-2 in FIG. 3). The electrical signals selected by the selectors 14 are output to transfer units 21 via clock data recovery circuits (CDR) 15.

The transfer units 21 transfer the electrical signal to the user device. The transfer units 21 may be a local area network (LAN) port for a wired user or a scheme in which a dynamic bandwidth allocation (DBA) control scheme used in a PON system is incorporated in a GATE or REPORT message, or may transfer a signal to the user device through wireless transmission.

On the basis of a control signal (a service start or end) from the OLT, the ONU 301 drives the selector 14 such that the selector 14 selects the electrical signal to be selected. A manager may preset the selector 14. In this manner, the ONU 301 can simultaneously receive and photoelectrically convert two or more wavelengths, and the selector 14 selects and receives a wavelength assigned to a desired service.

Specifically, the ONU 301 selects an electrical signal corresponding to a desired wavelength using the selector 14 among electrical signals after the photoelectric conversion of each wavelength via the light receiver 12 and the LA 13, and inputs the electrical signal to the CDR 15. By making a configuration in which the output from each LA 13 is input to a plurality of signal selection units 10-*a* and 10-*b* including the selector 14 and the CDR 15, a single ONU can simultaneously receive a plurality of wavelengths and an ONU capable of providing different wavelength services to different users can be provided.

Although the signal selection units 10-*a* and 10-*b* are implemented in the ONU in the present embodiment, the present invention can be implemented even when a receiving circuit in which a light receiving unit having the function of the signal selection unit is incorporated is provided.

Also, the ONU 301 includes two transfer units 21-*a* and 21-*b*, but the number of transfer units may be three or more. In this case, the electrical signal output from each LA 13 is branched according to the number of transfer units.

Second Embodiment

Figure 4:
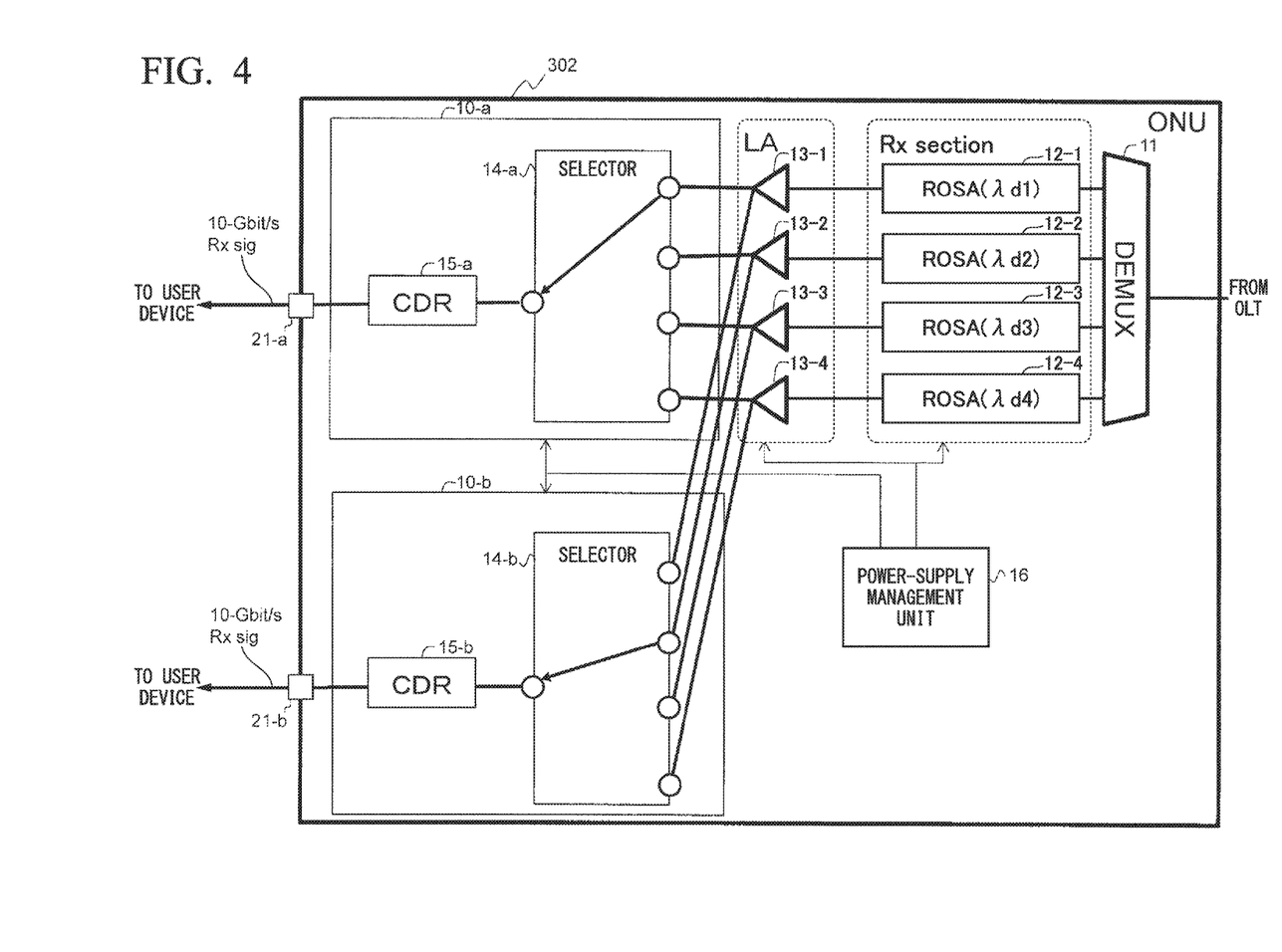
FIG. 4 is a block diagram showing a configuration of an ONU according to a second embodiment of the present invention.

FIG. 4 shows an ONU 302 of the present embodiment. The ONU 302 further includes a power-supply management unit 16 configured to stop a power supply of a light receiver 12 that outputs a signal which is not selected by any selector 14 and a power supply of an LA 13 that amplifies a signal which is not selected by any selector 14 in the configuration of the ONU 301 described with reference to FIG. 3.

The ONU 302 disconnects a power supply of a circuit whose wavelength is not used by the user device in the power-supply management unit 16. For example, the power-supply management unit 16 switches ON/OFF of a drive voltage of the ROSA photodiode or the LA. Further, a function of switching ON/OFF of a drive voltage/current of a CDR 15 or an electronic circuit (for example, a transfer unit 21) at a stage subsequent to the CDR may be added. Thereby, because unnecessary electricity is not used, unnecessary power consumption due to an increased number of ports of the transfer unit 21 can be reduced, and the ONU can be operated with low power consumption.

Further, in order to turn off drive voltages/currents of an ROSA, an LA, a CDR, and the like related to an unnecessary wavelength, an unnecessary service, which is not under contract to the user, is not photoelectrically converted by the ROSA, so that there is an advantageous effect in that the confidentiality of a received signal is improved. Thereby, it is possible to obtain an effect of making it impossible for the user to receive a service which is not under contract unintentionally or non-intentionally, and it is possible to enhance the effect of preventing illegal reception and the secrecy of communication content. That is, it is possible to securely provide received signals irrespective of there being a plurality of wavelengths or the same wavelength.

Third Embodiment

Figure 5:
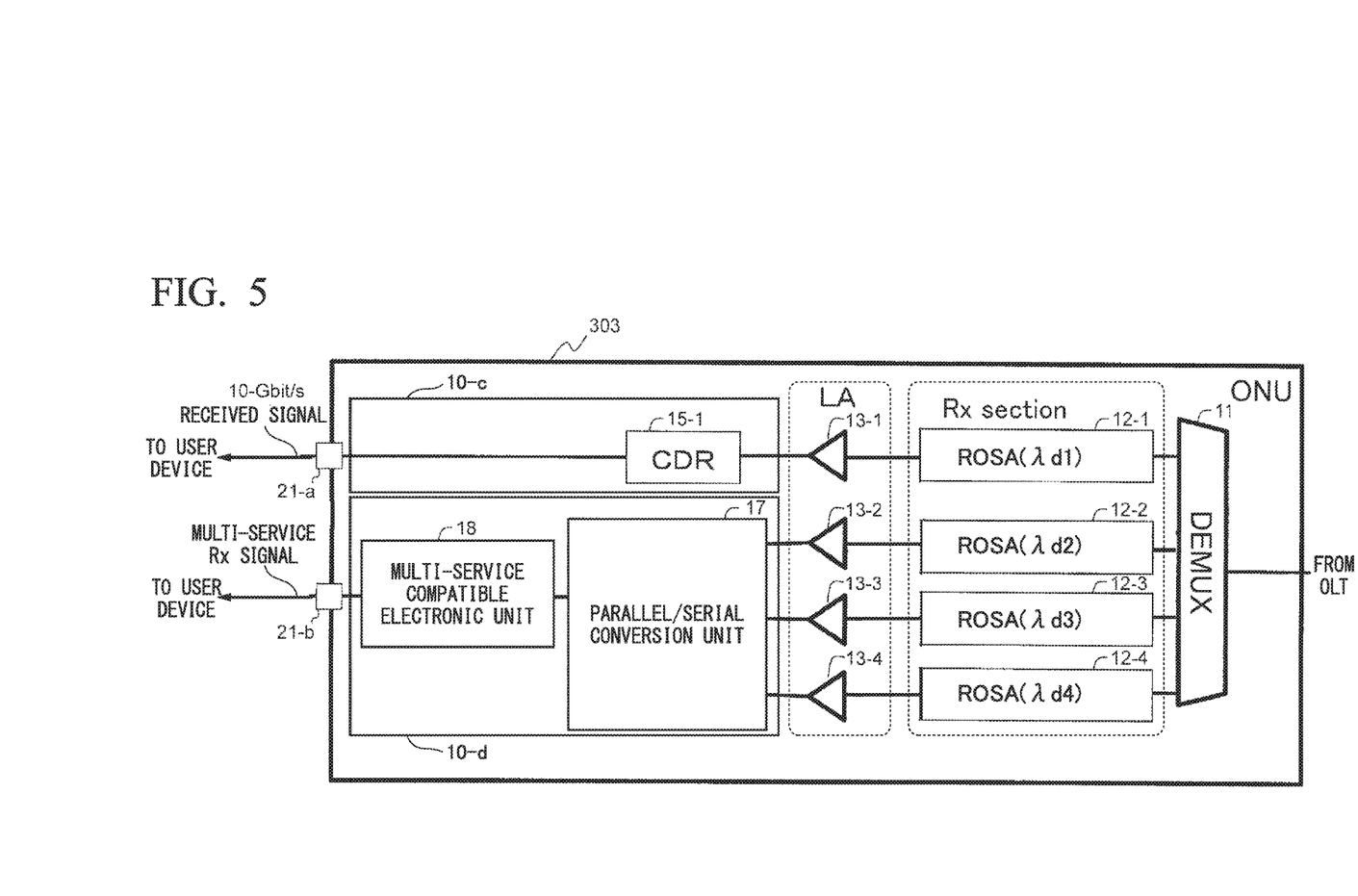
FIG. 5 is a block diagram showing a configuration of an ONU according to a third embodiment of the present invention.

FIG. 5 is a diagram showing an ONU 303 of the present embodiment. Similar to the ONU described with reference to FIGS. 3 and 4, the ONU 303 also performs ON/OFF switching of drive voltages of a photodiode, an LA, an CDR, and the like assigned to a wavelength channel to receive a wavelength assigned to a service on the basis of a control signal (a service start or end) from an OLT in an ONU wavelength tunable receiver capable of simultaneously receiving and photoelectrically converting two or more wavelengths.

The ONU 303 can provide multiple services by selectively receiving a plurality of electrical signals in a multi-service compatible electronic unit 18 for various services provided using a plurality of wavelengths.

In the present embodiment, a wavelength λd1 is adapted for data communication. A data signal of the wavelength λd1 photoelectrically converted by a light receiver 12-1 is output from a transfer unit 21-*a* as a 10 G electrical signal via an LA 13-1 and a CDR 15-1.

On the other hand, in the present embodiment, wavelengths λd2 to λd4 are multi-service signals. The ONU 303 includes a parallel/serial conversion unit 17 and a multi-service compatible electronic unit 18 corresponding to multi-service reception. The parallel/serial conversion unit 17 performs parallel/serial conversion on electrical signals output from an LA 13-2 to an LA 13-4. The multi-service compatible electronic unit 18 extracts a frame including a desired service from among the electrical signals serving as serial signals on the basis of identification information or the like included in the frame, and outputs the extracted frame to a transfer unit 21-*b*. The identification information is information included in a header of the frame and is information indicating a service. A logical link ID (LLID) may be used as the information included in the header. Accordingly, the ONU 303 can select and receive any service from the multiple services to be provided using a plurality of services.

The selector provided in the ONU in the first or second embodiment selects a signal on the basis of a control signal from the OLT. On the other hand, in the ONU 303 in the present embodiment the multi-service compatible electronic unit 18 extracts information about a service selected by the user and outputs the extracted information to the transfer unit 21-*b*. Consequently, the ONU 303 of the present embodiment can output information about any service in accordance with the user's selection, irrespective of the control of the OLT, thereby improving the user's convenience.

Also, in the present embodiment, the parallel/serial conversion unit 17 selectively receives only one service of the multiple services, but, if necessary, it is also possible to selectively receive a plurality of wavelengths, that is, a plurality of services by providing a plurality of transfer units 21-*b*.

Also, the ONU 303 can also turn off a power supply of a light receiver 12 related to an unnecessary wavelength. Because the ONU 303 does not perform photoelectric conversion on an unnecessary service that the user does not contract, it is possible to enhance confidentiality of a received signal with respect to the user and to obtain an effect of also preventing illegal service reception for a service provider.

Also, the ONU 303 can also reduce power consumption by turning off the drive voltage/current of the LA, the CDR, an electronic multi-service receiving unit, or the like of a wavelength in which no service is received.

[Supplementary Notes]

The following is a description of the ONU of the present embodiment:

(1):

A subscriber device having a receiving unit for selecting a wavelength from a signal from a higher-order unit and transferring the wavelength to a lower-order unit, the subscriber device including:

for each transfer unit for a user device, an electric switch configured to selectively output an electrical signal from one light receiving circuit among the plurality of light receiving circuits from input signals of a plurality of wavelengths from the higher-order unit; and a control circuit configured to change the one light receiving circuit selected by the electric switch.

(2):

The subscriber device including a power-supply management unit configured to stop a power supply of an element related to a wavelength for which reception is unnecessary in a lower-order user device among signals from the higher-order unit.

(Effects)

By enabling an ONU to simultaneously receive a plurality of wavelengths, it is possible to diversify services capable of being received by the user, it is possible to simultaneously receive a plurality of wavelengths while maintaining power saving, and it can be expected to enhance confidentiality of communication content and illegal reception prevention effect.

INDUSTRIAL APPLICABILITY

The present invention can also be applied to a field of application in which a signal including a plurality of wavelengths at the same time is required to be received.

REFERENCE SIGNS LIST 10-a, 10-b, 10-c, 10-d Signal selection unit
11 Demultiplexer
12, 12-1, 12-2, 12-3, 12-4 Light receiver
13, 13-1, 13-2, 13-3, 13-4 LA
14, 14-a, 14-b Selector
15, 15-a b, 15-1 CDR
16 Power-supply management unit
17 Parallel/serial conversion unit
18 Multi-service compatible electronic unit
21, 21-a. 21-b Transfer unit
301 to 303 ONU

The invention claimed is:

1. A subscriber device comprising:
   a demultiplexer configured to demultiplex input wavelength-multiplexed light into a plurality of light signals for each wavelength;
   a plurality of light receivers configured to receive each of the plurality of light signals obtained through demultiplexing by the demultiplexer and to convert the light signals into electrical signals;
   a plurality of limiting amplifiers configured to amplify each of the plurality of electrical signals output from the plurality of light receivers; and
   a plurality of signal selection units configured to select a plurality of signals to be received from among a plurality of amplified signals output from the plurality of limiting amplifiers,
   wherein at least one of the plurality signal selection units is configured to extract a frame including a desired service from among frames included in the plurality of amplified signals on a basis of identification information included in each of the frames.

2. The subscriber device according to claim 1, wherein each of the plurality of signal selection units exclusively is configured to select an amplified signal from among the plurality of amplified signals output from the plurality of limiting amplifiers as the signal to be received.

3. The subscriber device according to claim 1, further comprising:
   a power-supply management unit configured to stop a power supply of a light receiver that outputs the electrical signal which is not selected by any one of the plurality of signal selection units and a power supply of a limiting amplifier that outputs the amplified signal which is not selected by any one of the plurality of signal selection units.

4. A light receiving method comprising:
   a demultiplexing procedure of demultiplexing input wavelength-multiplexed light into a plurality of light signals for each wavelength;
   a light receiving procedure in which a plurality of light receivers receive each of the plurality of light signals obtained through demultiplexing in the demultiplexing procedure and convert the plurality of light signals into a plurality of electrical signals;
   an amplifying procedure in which a plurality of limiting amplifiers amplify each of the plurality of electrical signals output from the plurality of light receivers; and
   a selecting procedure in which a plurality of signal selection units select a plurality of signals to be received from among a plurality of amplified signals output from the plurality of limiting amplifiers,
   in the selecting procedure, at least one of the plurality of signal selection units extracts a frame including a desired service from among frames included in the plurality of amplified signals on a basis of identification information included in each of the frames.

* * * * *